United States Patent
Du

(10) Patent No.: US 11,386,076 B2
(45) Date of Patent: Jul. 12, 2022

(54) DATA PROCESSING METHOD AND APPARATUS BASED ON BLOCKCHAIN NETWORK, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Zhichao Du, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/163,582

(22) Filed: Feb. 1, 2021

(65) Prior Publication Data

US 2021/0157788 A1 May 27, 2021

Related U.S. Application Data

(63) Continuation of application No. PCT/CN2020/120041, filed on Oct. 9, 2020.

(30) Foreign Application Priority Data

Oct. 15, 2019 (CN) .......................... 201910976287.4

(51) Int. Cl.
G06F 16/22 (2019.01)
G06F 16/23 (2019.01)

(52) U.S. Cl.
CPC ...... *G06F 16/2365* (2019.01); *G06F 16/2282* (2019.01)

(58) Field of Classification Search
None
See application file for complete search history.

(56) References Cited

U.S. PATENT DOCUMENTS 6,976,209 B1 * 12/2005 Storisteanu ........... G06F 40/169
715/201
2018/0293583 A1 10/2018 Rhie et al.
(Continued)

FOREIGN PATENT DOCUMENTS

CN 106878071 A 6/2017
CN 107330681 A 11/2017
(Continued)

OTHER PUBLICATIONS

The World Intellectual Property Organization (WIPO) International Search Report for PCT/CN2020/120041 dated Jan. 12, 2021 8 Pages (including translation).
(Continued)

*Primary Examiner* — Wilson Lee
(74) *Attorney, Agent, or Firm* — Anova Law Group, PLLC

(57) ABSTRACT

A data processing method is provided for an electronic device. The method includes obtaining from a target node a transaction request for off-chain data, parsing the transaction request to obtain a transaction parameter and a chain height parameter of the target node, querying, according to the chain height parameter of the target node, for the off-chain data, in response to determining the off-chain data is present in the data manager, sending the off-chain data to the target node, and in response to determining the off-chain data is absent in the data manager, obtaining the off-chain data from a data source according to a type of the target node.

20 Claims, 12 Drawing Sheets

(56) References Cited

U.S. PATENT DOCUMENTS

| | | | |
|---|---|---|---|
| 2019/0132350 A1* | 5/2019 | Smith | G06Q 20/38215 |
| 2019/0158594 A1* | 5/2019 | Shadmon | G06F 16/2471 |
| 2019/0236606 A1* | 8/2019 | Padmanabhan | G06Q 20/3821 |
| 2020/0067697 A1* | 2/2020 | Puddu | G06F 21/602 |
| 2020/0110813 A1* | 4/2020 | Kamijoh | H04L 9/3247 |
| 2020/0252406 A1* | 8/2020 | Padmanabhan | H04L 9/3239 |
| 2020/0349502 A1* | 11/2020 | Govekar | G06Q 10/0833 |
| 2021/0011647 A1* | 1/2021 | Coleman | G06F 3/0647 |

FOREIGN PATENT DOCUMENTS

| | | |
|---|---|---|
| CN | 108600301 A | 9/2018 |
| CN | 108734453 A | 11/2018 |
| CN | 109493223 A | 3/2019 |
| CN | 109859047 A | 6/2019 |
| CN | 109886681 A | 6/2019 |
| CN | 110727712 A | 1/2020 |

OTHER PUBLICATIONS

Chao Yuan, "Defense Scheme During Hard Bifurcation in Block Chain", Modern Computer, Mar. 31, 2019 (Mar. 31, 2019), pp. 3-7. 6 pages.

* cited by examiner

US 11,386,076 B2

DATA PROCESSING METHOD AND APPARATUS BASED ON BLOCKCHAIN NETWORK, ELECTRONIC DEVICE, AND STORAGE MEDIUM

RELATED APPLICATIONS

This application is a continuation application of PCT Patent Application No. PCT/CN2020/120041, filed on Oct. 9, 2020, which claims priority to Chinese Patent Application No. 201910976287.4 filed on Oct. 15, 2019, all of which are incorporated herein by reference in entirety.

FIELD OF THE TECHNOLOGY

The present disclosure relates to information storage technologies in a blockchain network, and in particular, to a data processing method and apparatus based on a blockchain network, an electronic device, and a storage medium.

BACKGROUND

According to the related art, in a blockchain network, when a node in the blockchain network needs to access off-chain data, corresponding blockchain nodes in the blockchain network directly access data from an off-chain data source. When off-chain data obtained by the blockchain nodes in the blockchain network is inconsistent, a fork between different blockchain nodes in the blockchain network is caused, thereby affecting the efficiency of data processing in the blockchain network.

SUMMARY

One aspect of the present disclosure provides a data processing method executed by a data manager connected to a blockchain network. The method includes obtaining from a target node a transaction request for off-chain data, parsing the transaction request to obtain a transaction parameter and a chain height parameter of the target node, querying, according to the chain height parameter of the target node, for the off-chain data, in response to determining the off-chain data is present in the data manager, sending the off-chain data to the target node, and in response to determining the off-chain data is absent in the data manager, determining a type of the target node according to the transaction parameter, and obtaining the off-chain data from a data source according to the type of the target node as determined. In certain embodiments, the method may further include establishing a connection between the data manager and the target node in the blockchain network and establishing a connection between the data manager and the data source. In certain other embodiments, the data manager may be an off-chain data manager and the data source may be an off-chain data source.

Another aspect of the present disclosure provides a data processing apparatus. The data processing apparatus includes a memory and a processor coupled to the memory. The processor is positioned to perform obtaining from a target node a transaction request for off-chain data, parsing the transaction request to obtain a transaction parameter and a chain height parameter of the target node, querying, according to the chain height parameter of the target node, for the off-chain data, in response to determining the off-chain data is present in the data manager, sending the off-chain data to the target node, and in response to determining the off-chain data is absent in the data manager, determining a type of the target node according to the transaction parameter, and obtaining the off-chain data from a data source according to the type of the target node as determined.

Yet another aspect of the present disclosure provides a non-transitory computer-readable storage medium. The non-transitory computer-readable storage medium stores computer program instructions executable by at least one processor to perform obtaining from a target node a transaction request for off-chain data, parsing the transaction request to obtain a transaction parameter and a chain height parameter of the target node, querying, according to the chain height parameter of the target node, for the off-chain data, in response to determining the off-chain data is present in the data manager, sending the off-chain data to the target node, and in response to determining the off-chain data is absent in the data manager, determining a type of the target node according to the transaction parameter, and obtaining the off-chain data from a data source according to the type of the target node as determined.

Other aspects of the present disclosure can be understood by those skilled in the art in light of the description, the claims, and the drawings of the present disclosure.

BRIEF DESCRIPTION OF THE DRAWINGS

To more clearly describe technical solutions of certain embodiments of the present disclosure, described below are accompanying drawings. The accompanying drawings are illustrative of embodiments of the present disclosure, and a person of ordinary skill in the art may still derive other drawings from these accompanying drawings without creative efforts.

DETAILED DESCRIPTION

Figure 1:
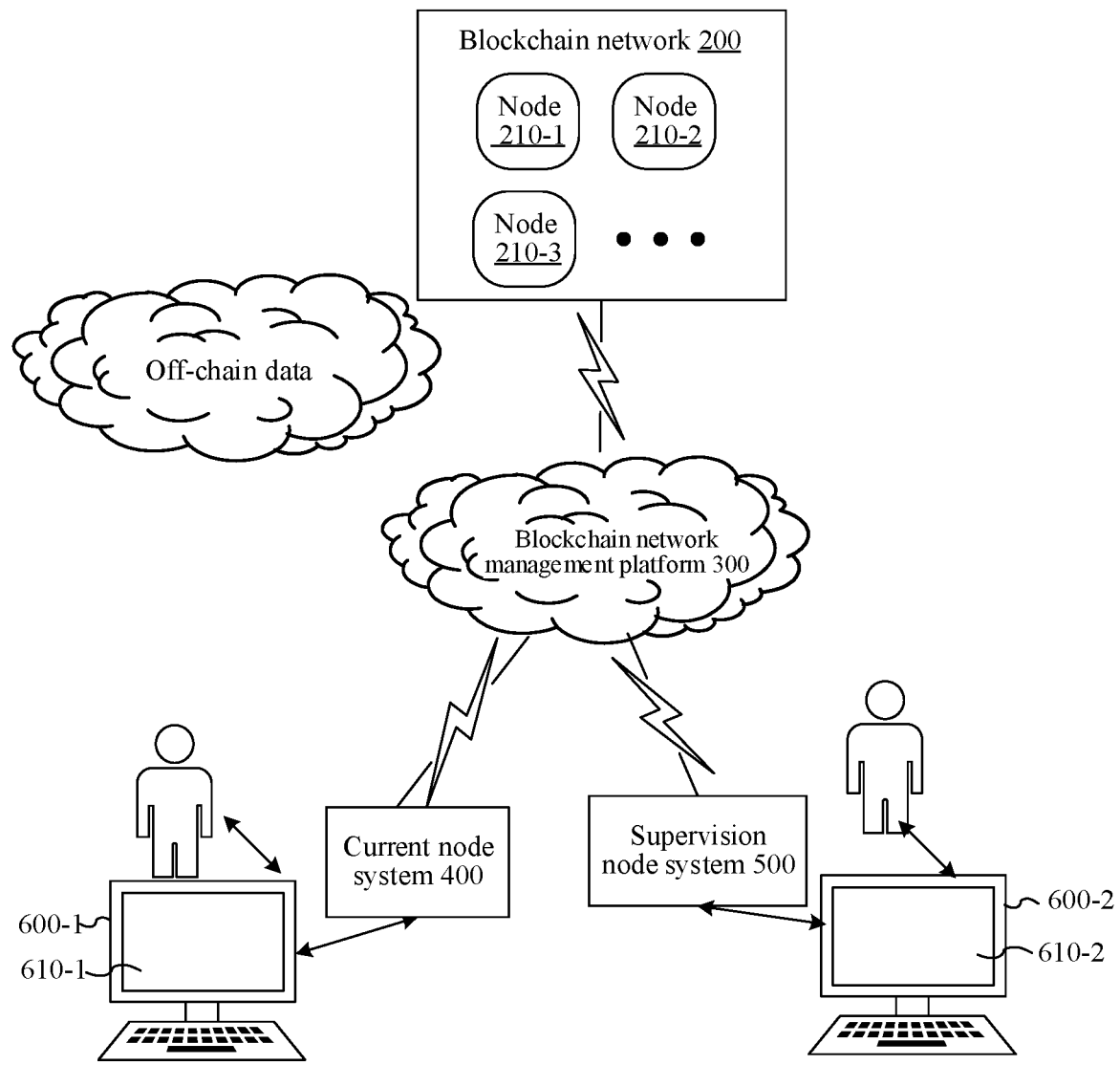
FIG. 1 is a schematic diagram of a use environment of a data processing method based on a blockchain network according to one or more embodiments of the present disclosure.

To make the objectives, technical solutions, and advantages of the present disclosure clearer, the following describes certain embodiments of the present disclosure in detail with reference to the accompanying drawings. The described embodiments are not to be construed as a limitation to embodiments of the present disclosure. All other embodiments obtained by a person of ordinary skill in the art without creative efforts shall fall within the protection scope of embodiments of the present disclosure.

Throughout the description, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

Before embodiments of the present disclosure are further described in detail, terms involved in certain embodiments of the present disclosure are described, and the terms involved in certain embodiments of the present disclosure are subject to the following explanations.

In certain embodiments of the present disclosure, a "transaction" includes an operation that is submitted to a blockchain network for execution as a computer term, rather than simply refers to a transaction in a business context. In view of the conventional use of the term "transaction" in blockchain technologies, at least certain embodiments of the present disclosure follow this convention.

For example, a deploy transaction is configured to install a specified smart contract on a node in the blockchain network for invocation; an invoke transaction is configured to add a transaction record to a blockchain by invoking a smart contract, and perform an operation on a state database of the blockchain, including an update operation (including adding, deleting, or modifying a key-value pair in the state database) and a query operation (that is, querying for a key-value pair in the state database).

In certain embodiments of the present disclosure, a "blockchain" is a storage structure of encrypted and chained transactions that includes blocks.

For example, a header of each block may not only include hash values of all transactions in the block, but also include hash values of all transactions in a previous block, to implement anti-tampering and anti-counterfeiting of a transaction in a block based on hash values. A newly generated transaction is filled into a block and after a consensus process of nodes in a blockchain network, the block is added to an end of the blockchain to form a chain growth.

In certain embodiments of the present disclosure, a "blockchain network" is a series of nodes that incorporate new blocks into a blockchain through consensus.

In certain embodiments of the present disclosure, a "ledger" is a collective term for a blockchain (also referred to as ledger data) and a state database synchronized with the blockchain.

The blockchain records transactions in the form of files in a file system. The state database records the transactions in the blockchain in the form of different types of key-value pairs, and is configured to support quick query of the transactions in the blockchain.

In certain embodiments of the present disclosure, a "smart contract", also referred to as chaincode or application code, is a program deployed in a node of a blockchain network. The node executes a smart contract invoked in a received transaction, to perform an update operation or a query operation on key-value pair data of a ledger database.

In certain embodiments of the present disclosure, a "consensus" is a process in a blockchain network, and is configured as follows: After an agreement is reached between a plurality of involved nodes on a transaction in a block, the agreed block is added to an end of a blockchain. A mechanism for implementing the consensus includes proof of work (PoW), proof of stake (PoS), delegated proof-of-stake (DPoS), proof of elapsed time (PoET), and the like.

The following describes an exemplary implementation of a blockchain network provided in certain embodiments of the present disclosure. FIG. 1 is a schematic diagram of a use environment of a data processing method based on a blockchain network according to one or more embodiments of the present disclosure, including a blockchain network 200 (exemplarily shown as including a node 210-1 to a node 210-3, any one or combination of which is collectively termed a node 210 or nodes 210), a blockchain network management platform 300, a current node system 400 (a terminal 600-1 belonging to the current node system 400 and a graphical interface 610-1 thereof are exemplarily shown), and a supervision node system 500 (a terminal 600-2 belonging to the supervision node system 500 and a graphical interface 610-2 thereof are exemplarily shown), which are respectively described below. In certain embodiments, the current node system 400 includes and/or is connected to the first off-chain data manager or the second off-chain data manager referenced in FIG. 15. In certain other embodiments, the supervision node system 500 includes and/or is connected to the second off-chain manager or the first off-chain data manager referenced in FIG. 15.

A type of the blockchain network 200 is flexible and diverse, for example, the type may be any of a public chain, a private chain, or a consortium chain. Using the public chain as an example, an electronic device such as a user terminal and a server of any service entity may access the blockchain network 200 without authorization. Using the consortium chain as an example, an electronic device (such as a terminal/server) managed by a service entity may access the blockchain network 200 after the service entity is authorized. In this case, the electronic device becomes a special node in the blockchain network 200, that is, a client node.

The client node may only provide a function of supporting the service entity in initiating a transaction (for example, used for chaining to store data or querying for on-chain data). For functions of the general (native) node 210 of the blockchain network 200, for example, a sorting function, a consensus service, and a ledger function described below, the client node may implement them by default or selectively (for example, depending on a specific service need of the service entity). In this way, data and service processing logic of the service entity may be migrated to the blockchain network 200 to the greatest extent, and credibility and traceability of the data and service processing processes are implemented through the blockchain network 200.

The blockchain network 200 receives transactions submitted from client nodes (such as the terminal 600-1 belonging to the current node system 400 and the terminal 600-2 belonging to the supervision node system 500 shown in FIG. 1) of different service entities (such as the current node system 400 and the supervision node system 500 shown in FIG. 1), executes the transactions to update a ledger or query a ledger, and displays various intermediate results and final results of executing the transactions in user interfaces (such as the graphical interface 610-1 of the terminal 600-1 and the graphical interface 610-2 of the terminal 600-2) of terminals. It may be understood that, in the blockchain network 200, the transactions may be received and executed by the native node 210 in the blockchain network 200. Certainly, when a client node of a service entity has the functions (such as a consensus function and a ledger function) of the native node 210 in the blockchain network 200, the transactions may be received and executed by the corresponding client node.

The following describes an exemplary implementation of the blockchain network by using an example in which a plurality of service entities (different node systems) access the blockchain network to manage logistics data.

Referring to FIG. 1, a logistics stage involves a plurality of service entities such as the current node system 400 and the supervision node system 500. After having been authorized by the blockchain network management platform 300, both the terminal 600-1 of the current node system 400 and the terminal 600-2 of the supervision node system 500 may access the blockchain network 200.

Service personnel of the current node system 400 log in to the current node system 400 in the graphical interface 610-1 of the terminal 600-1, and input a corresponding transaction request transmitted by using a target node, or input a corresponding request to query for off-chain data. The query request is transmitted to the blockchain network management platform 300, and the blockchain network management platform 300 generates a transaction corresponding to an update operation/query operation according to the received query request. In the transaction, a smart contract is invoked to implement the update operation/query operation and a parameter transferred to the smart contract are specified. The transaction further carries a digital signature signed by the current node system 400 (for example, the digital signature is obtained by encrypting a digest of the transaction by using a private key in a digital certificate of the current node system 400). The transaction is broadcast to the blockchain network 200.

After receiving the transaction, a node 210 in the blockchain network 200 performs verification on the digital signature carried in the transaction. After the digital signature is verified successfully, according to an identity of the current node system 400 carried in the transaction, it is determined whether the current node system 400 has a transaction permission. The transaction fails if either of the digital signature verification and the permission verification fails. After the verification succeeds, a digital signature of the node 210 is signed (for example, the digital signature is obtained by encrypting the digest of the transaction by using a private key of the node 210), and is further broadcast in the blockchain network 200.

After a node 210 with the sorting function in the blockchain network 200 receives the successfully verified transaction, the transaction is filled into a new block and broadcast to nodes that provide the consensus service in the blockchain network 200.

The nodes 210 that provide the consensus service in the blockchain network 200 perform a consensus process on the new block to reach a consensus. A node 210 that provides the ledger function adds the new block to the end of the blockchain and executes the transaction in the new block. For a transaction for updating off-chain data, a key-value pair corresponding to the off-chain data in the ledger database is updated. For a transaction for querying for off-chain data, the ledger database is queried for a key-value pair corresponding to the off-chain data and a query result is returned.

Similarly, service personnel on the side of the supervision node system 500 may log in to the supervision node system 500 in the graphical interface 610-2 of the terminal 600-2 (the supervision node system may be configured with the highest level of permissions to view off-chain data uploaded by different institutions), and input an off-chain data query request. The query request is transmitted to the blockchain network management platform 300, and the blockchain network management platform 300 generates a transaction corresponding to an update operation/query operation according to the received query request. In the transaction, a smart contract that needs to be invoked to implement the update operation/query operation and a parameter transferred to the smart contract are specified. The transaction further carries a digital signature signed by the supervision node system 500 (for example, the digital signature is obtained by encrypting a digest of the transaction by using a private key of a digital certificate of the supervision node system 500). The transaction is broadcast to the blockchain network 200. Further, it may be understood that, types of data that can be queried for/updated in the blockchain network 200 by nodes (service entities) of different institutions may be implemented by restricting transaction permissions of the service entities. For example, when the current node system 400 has a permission to initiate a transaction to query for target off-chain data, the service personnel of the current node system 400 may input a target off-chain data query request in the graphical interface 610-1 of the terminal 600-1, and the blockchain network management platform 300 generates a transaction for querying for the target off-chain data and broadcasts the transaction to the blockchain network 200, to obtain the corresponding target off-chain data from the blockchain network 200. When the supervision node system 500 has a permission to initiate a transaction to query for off-chain data, the service personnel on the side of the supervision node system 500 may input an off-chain data query request in the graphical interface 610-2 of the terminal 600-2, and the blockchain network management platform 300 generates a transaction for querying for the off-chain data and broadcasts the transaction to the blockchain network 200, to obtain the corresponding off-chain data from the blockchain network 200. In addition, the supervision node system 500 may further store an original record of the off-chain data, which can perform verification on off-chain data inputted by a target user, for example, perform verification on corresponding identity card information or a corresponding hash value in the off-chain data.

Figure 2:
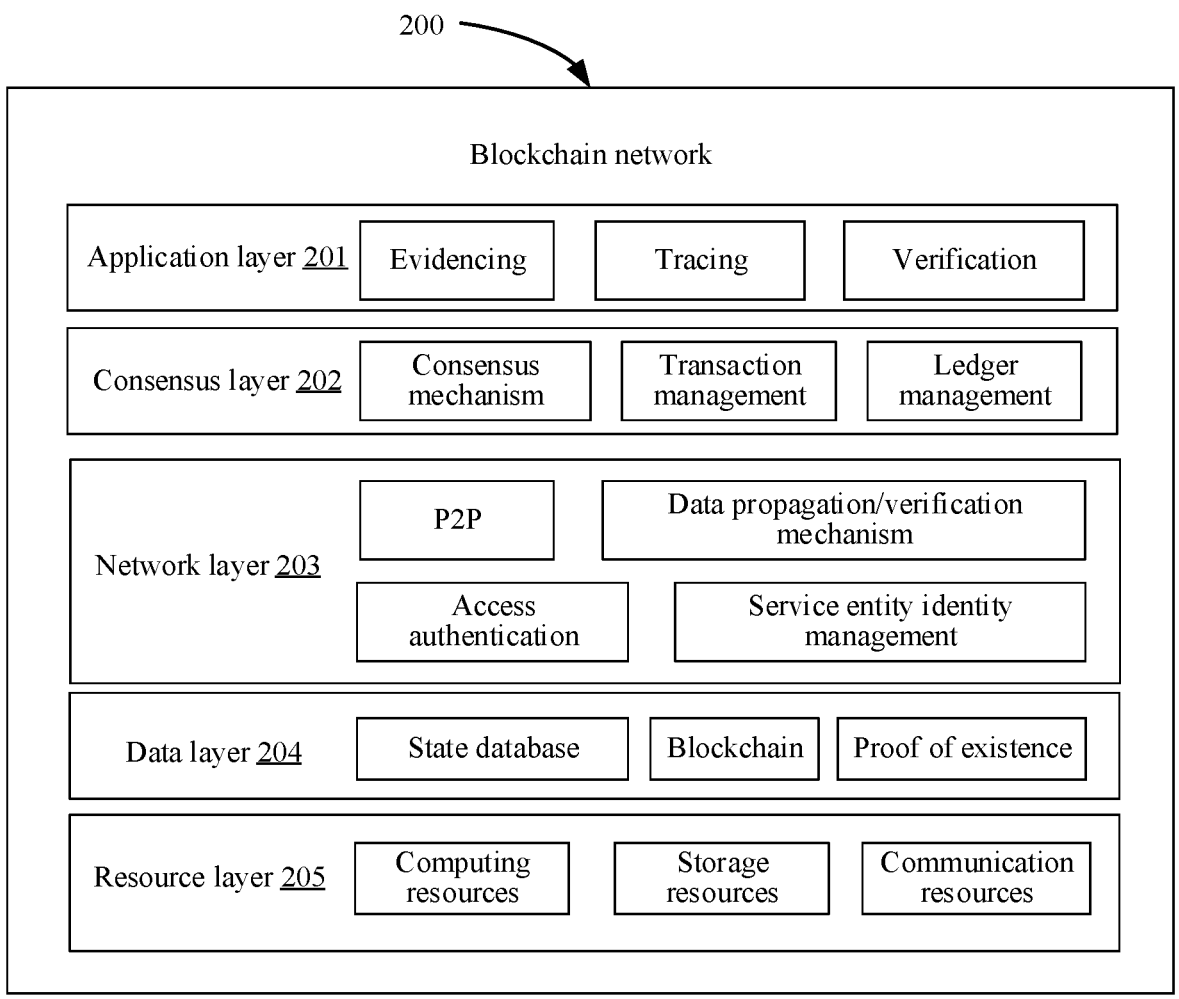
FIG. 2 is a schematic diagram of a function architecture of a blockchain network 200 according to one or more embodiments of the present disclosure.

The following describes an exemplary function architecture of a blockchain network according to an embodiment of the present disclosure. FIG. 2 is a schematic diagram of a function architecture of the blockchain network 200 according to certain embodiments of the present disclosure, including an application layer 201, a consensus layer 202, a network layer 203, a data layer 204, and a resource layer 205, which are respectively described below.

The resource layer 205 includes computing resources, storage resources, and communication resources for implementing the nodes 210 in the blockchain network 200, such as computing resources, storage resources, and communication resources in computers, servers/clusters, and cloud, and abstracts the resources and provides a unified interface to the data layer 204, to shield a difference of underlying hardware in implementing the resource layer 205.

The computing resources include various forms of processors, such as a central processing unit (CPU), an application-specific integrated circuit (ASIC), or a dedicated integrated circuit, and a field-programmable gate array (FPGA).

The storage resources include various types of storage media such as a volatile memory and non-volatile memory. The non-volatile memory may be a read-only memory (ROM) or a programmable read-only memory (PROM). The volatile memory may be a random access memory (RAM), used as an external cache.

The communication resources include various links for communication between the nodes 210 of the blockchain network, and between the blockchain network 200 and the service entities.

The data layer 204 includes various data structures for implementing a ledger, including a blockchain implemented with a file in a file system, a key-value state database, and a proof of existence (for example, a hash tree of a transaction in a block).

The network layer 203 includes functions of a point to point (P2P) network protocol, a data propagation mechanism, a data verification mechanism, an access authentication mechanism, and service entity identity management.

The P2P network protocol implements communication between the nodes 210 in the blockchain network 200. The data propagation mechanism ensures transmission of transactions in the blockchain network 200. The data verification mechanism is used for implementing reliability of data transmission between the nodes 210 based on a cryptography method (such as a digital certificate, a digital signature, and a public/private key pair). The access authentication mechanism is used for authenticating an identity of a service entity joining the blockchain network 200 according to an actual service scenario, and for assign the service entity a permission to access the blockchain network 200 when the authentication succeeds. The service entity identity management is used for storing the identity and the permission (such as a type of a transaction that can be initiated) of the service entity allowed to access the blockchain network 200.

The consensus layer 202 includes functions of a mechanism (that is, a consensus mechanism) for the nodes 210 in the blockchain network 200 to reach a consensus on a block, transaction management, and ledger management.

The consensus mechanism includes consensus algorithms such as POS, POW, and DPOS, and supports a pluggable consensus algorithm.

The transaction management is configured to perform verification on a digital signature carried in a transaction received by any of the nodes 210, perform verification on identity information of a service entity, and determine, according to the identity information (by reading relevant information from the service entity identity management), whether the service entity has a permission to perform the transaction. Each service entity authorized to access the blockchain network 200 has a digital certificate issued by an authentication center. The service entity signs a to-be-submitted transaction by using a private key in the digital certificate, to declare a valid identity of the service entity.

The ledger management is used for maintaining a blockchain and a ledger database. A block on which a consensus is reached is added to an end of the blockchain, and a transaction in the block on which a consensus is reached is performed. When the transaction includes an update operation, a key-value pair in the state database is updated. When the transaction includes a query operation, a key-value pair in the ledger database is queried for and a query result is returned to the service entity. Query operations of a plurality of dimensions on the ledger database are supported, including: querying for a block according to a serial number (such as a hash value of a transaction) of the block; querying for a block according to a hash value of the block; querying for a block according to a serial number of a transaction; querying for a transaction according to a serial number of the transaction; querying for account data of a service entity according to an account number (a serial number) of the service entity; and querying for a blockchain in a channel according to a name of the channel.

The application layer 201 includes various services that can be implemented by the blockchain network, including tracing, evidencing, verification, and the like on the transaction.

The following describes an exemplary structure of a node of a blockchain network according to an embodiment of the present disclosure. It may be understood that, a hardware structure of any type of node in the blockchain network 200 may be implemented according to the hardware structure described below.

Figure 3:
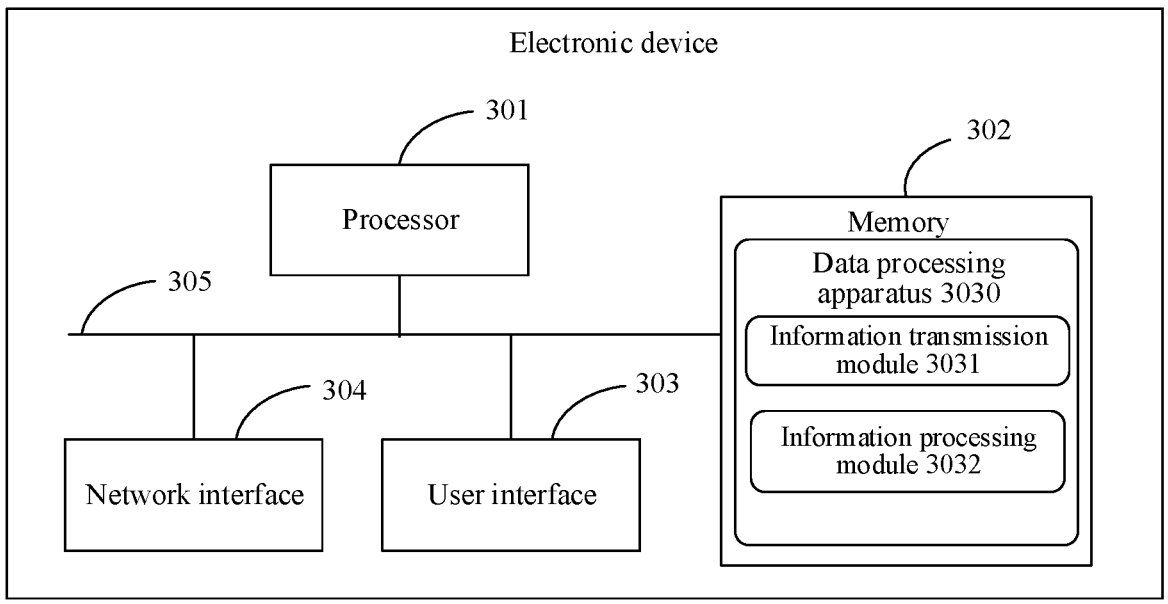
FIG. 3 is a schematic structural diagram of composition of an electronic device according to one or more embodiments of the present disclosure.

The following describes in detail a structure of an electronic device according to certain embodiments of the present disclosure. A data processing method based on a blockchain network provided in the present disclosure may be implemented by various types of electronic devices, such as a dedicated terminal with an information processing function, or may be implemented by an electronic device with an information processing function, such as the electronic device running the blockchain network management platform 300 in FIG. 1. FIG. 3 is a schematic structural diagram of composition of an electronic device according to certain embodiments of the present disclosure. It may be understood that, FIG. 3 shows only an exemplary structure rather than a complete structure of the electronic device. The structure shown in FIG. 3 may be partially or entirely implemented based on requirements.

The electronic device provided in this embodiment of the present disclosure includes: at least one processor 301, a memory 302, a user interface 303, and at least one network interface 304. The components in the electronic device are coupled by using a bus system 305. It may be understood that, the bus system 305 is configured to implement connection and communication between the components. In addition to a data bus, the bus system 305 further includes a power bus, a control bus, and a state signal bus. However, for ease of clear description, all types of buses are marked as the bus system 305 in FIG. 3.

The user interface 303 may include a display, a keyboard, a mouse, a track ball, a click wheel, a key, a button, a touch panel, a touchscreen, or the like.

It may be understood that, the memory 302 may be a volatile memory or a non-volatile memory, or may include both a volatile memory and a non-volatile memory. The memory 302 in this embodiment of the present disclosure can store data to support operations of a terminal (for example, 10-1). An example of the data includes any computer program to be operated on the terminal (for example, 10-1), for example, an operating system and an application program. The operating system includes various system programs, such as a framework layer, a kernel library layer, and a driver layer, which are configured to implement various basic services and process a task based on hardware. The application program may include various application programs.

In some embodiments, a data processing apparatus provided in certain embodiments of the present disclosure may be implemented in the form of a combination of software and hardware. In an example, the data processing apparatus provided according to certain embodiments of the present disclosure may be a processor in the form of a hardware decoding processor, and is programmed to execute the data processing method provided in certain embodiments of the present disclosure. For example, the processor in the form of a hardware decoding processor may use one or more ASICs, digital signal processor (DSP), programmable logic devices (PLDs), complex programmable logic device (CPLD), FPGAs, or other electronic elements.

In an example in which the data processing apparatus provided according to certain embodiments of the present disclosure is implemented by a combination of software and hardware, the data processing apparatus provided according to certain embodiments of the present disclosure may be directly embodied as a combination of software modules executed by the processor 301. The software modules may be located in a storage medium, and the storage medium is located in the memory 302. The processor 301 reads executable instructions included in the software modules in the memory 302 and uses necessary hardware (for example, including the processor 301 and other components connected to the bus 305) in combination, to substantiate the data processing method provided according to certain embodiments of the present disclosure.

In an example, the processor 301 may be an integrated circuit chip having a signal processing capability, for example, a general purpose processor, a DSP, or another PLD, discrete gate, transistor logical device, or discrete hardware component. The general purpose processor may be a microprocessor, any conventional processor, or the like.

In an example in which the data processing apparatus provided according to certain embodiments of the present disclosure is implemented by hardware, the data processing apparatus provided according to certain embodiments of the present disclosure may be directly executed by using the processor 301 in the form of a hardware decoding processor, for example, one or more ASICs, DSPs, PLDs, CPLDs, FPGAs, or other electronic elements, to execute the data processing method provided according to certain embodiments of the present disclosure.

The memory 302 in this embodiment of the present disclosure is configured to store various types of data to support operations of the electronic device. An example of the data includes: any executable instruction configured to be operated on the electronic device, such as an executable instruction, and a program that implements the data processing method according to certain embodiments of the present disclosure may be included in the executable instruction.

In other embodiments, the data processing apparatus based on a blockchain network provided in certain embodiments of the present disclosure may be implemented in the form of software. FIG. 3 shows a data processing apparatus 3030 based on a blockchain network that is stored in the memory 302, which may be software in the form of a program, a plug-in, or the like, and include a series of modules. An example of the program stored in the memory 302 may include the data processing apparatus 3030 based on a blockchain network. The data processing apparatus 3030 includes the following software modules: an information transmission module 3031, configured to obtain a transaction request transmitted by a target node; and an information processing module 3032, configured to parse the transaction request, to obtain a transaction parameter and a chain height parameter that match the target node; query, according to the chain height parameter corresponding to or matching the target node, for off-chain data that corresponds to the chain height parameter and that is stored in a current node; determine a type of the target node according to the transaction parameter corresponding to or matching the target node in response to determining that the current node stores no off-chain data corresponding to the chain height parameter or that the off-chain data is absent in the current node; and trigger a process matching the type of the target node according to the type of the target node, to obtain off-chain data corresponding to or matching the transaction request.

Figure 4:
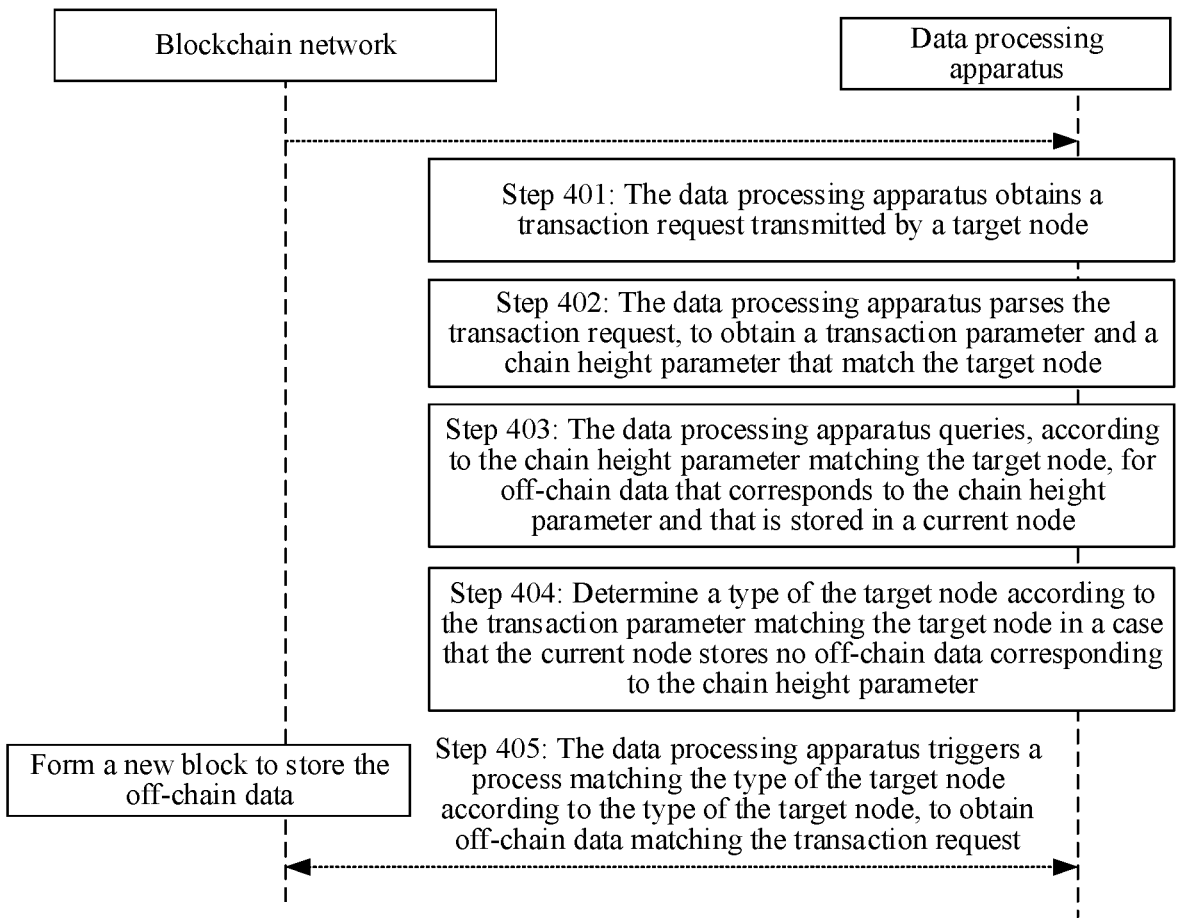
FIG. 4 is a schematic flowchart of a data processing method based on a blockchain network according to one or more embodiments of the present disclosure.

The data processing method provided according to certain embodiments of the present disclosure is described with reference to the electronic device shown in FIG. 3. FIG. 4 is a schematic flowchart of a data processing method based on a blockchain network according to certain embodiments of the present disclosure. It may be understood that, steps shown in FIG. 4 may be performed by various electronic devices running the data processing apparatus, such as a dedicated terminal, a server, or a server cluster with an off-chain data processing function. The following describes the steps shown in FIG. 4.

Step 401: The data processing apparatus obtains a transaction request transmitted by a target node.

Step 402: The data processing apparatus parses the transaction request, to obtain a transaction parameter and a chain height parameter that match the target node.

Step 403: The data processing apparatus queries, according to the chain height parameter corresponding to or matching the target node, for off-chain data that corresponds to the chain height parameter and that is stored in a current node.

In some embodiments of the present disclosure, the querying, according to the chain height parameter corresponding to or matching the target node, for off-chain data that corresponds to the chain height parameter and that is stored in a current node may be implemented in the following manner: triggering a chain height traversing process in response to the transaction request; and traversing, through the chain height traversing process according to the chain height parameter corresponding to or matching the target node, off-chain data stored in the current node, to query for the off-chain data that corresponds to the chain height parameter and that is stored in the current node. When off-chain data has been obtained by another node in the blockchain network, because the current node performs data synchronization, the current node stores corresponding off-chain data. Due to the unique certainty of the chain height parameter, the off-chain data stored in the current node is traversed to query for the off-chain data that corresponds to the chain height parameter and that is stored in the current node, which may effectively reduce the time required for obtaining the off-chain data and improve data processing efficiency of the blockchain network.

Step 404: Determine a type of the target node according to the transaction parameter corresponding to or matching the target node in response to determining that the current node stores no off-chain data corresponding to the chain height parameter.

In some embodiments of the present disclosure, the determining a type of the target node according to the transaction parameter corresponding to or matching the target node in response to determining that the current node stores no off-chain data corresponding to the chain height parameter may be implemented in the following manner: parsing the transaction parameter to obtain a corresponding type parameter of the target node in response to determining that the current node stores no off-chain data corresponding to the chain height parameter; determining that the type of the target node is a node included in a main chain of the blockchain network in response to determining that the type parameter of the target node is a first type parameter; and determining that the type of the target node is a node included in a side chain of the blockchain network in response to determining that the type parameter of the target node is a second type parameter. Because only a corresponding block in the main chain in the blockchain network may obtain the off-chain data, the corresponding type parameter of the target node is obtained, and the type of the target node is determined according to the transaction parameter corresponding to or matching the target node, so that the type of the target node that transmits the transaction request may be timely determined, so as to execute a process matching the type of the target node, to improve efficiency of obtaining the off-chain data.

Step 405: The data processing apparatus triggers a process matching the type of the target node according to the type of the target node, to obtain off-chain data corresponding to or matching the transaction request.

Figure 5:
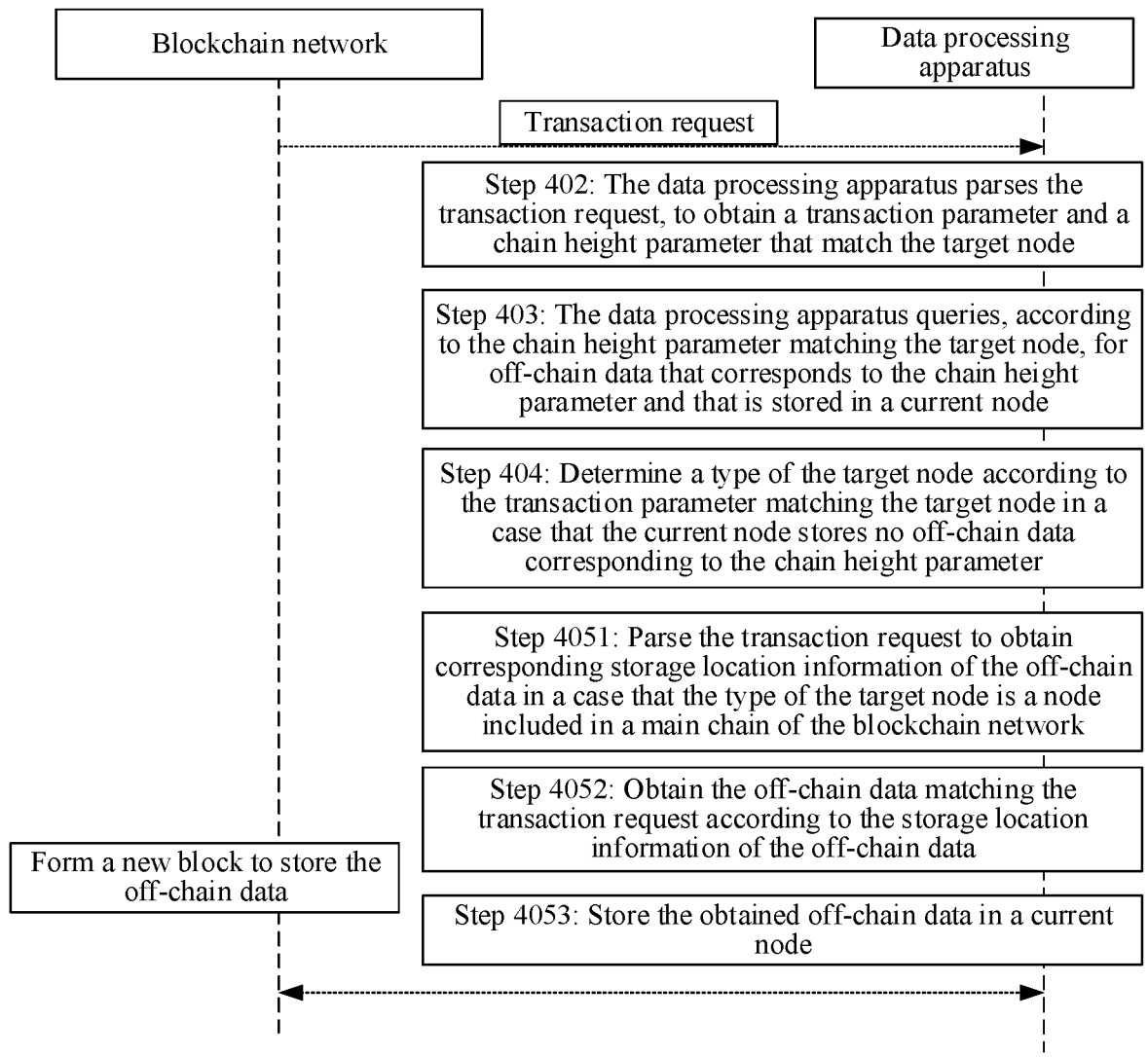
FIG. 5 is a schematic flowchart of a data processing method based on a blockchain network according to one or more embodiments of the present disclosure.

In some embodiments of the present disclosure, when the type of the target node is the node included in the main chain of the blockchain network, further refer to FIG. 5 based on the data processing method based on a blockchain network shown in FIG. 4. FIG. 5 is an optional schematic flowchart of a data processing method based on a blockchain network according to an embodiment of the present disclosure. A processing process includes the following steps:

Step 4051: Parse the transaction request to obtain corresponding storage location information of the off-chain data in response to determining that the type of the target node is the node included in the main chain of the blockchain network.

Step 4052: Obtain the off-chain data corresponding to or matching the transaction request according to the storage location information of the off-chain data.

Step 4053: Store the obtained off-chain data in the current node.

In this way, when the type of the target node is the node included in the main chain of the blockchain network, the off-chain data corresponding to or matching the transaction request may be directly obtained by using the storage location information of the off-chain data, to improve an off-chain data processing speed of the blockchain network.

Figure 6:
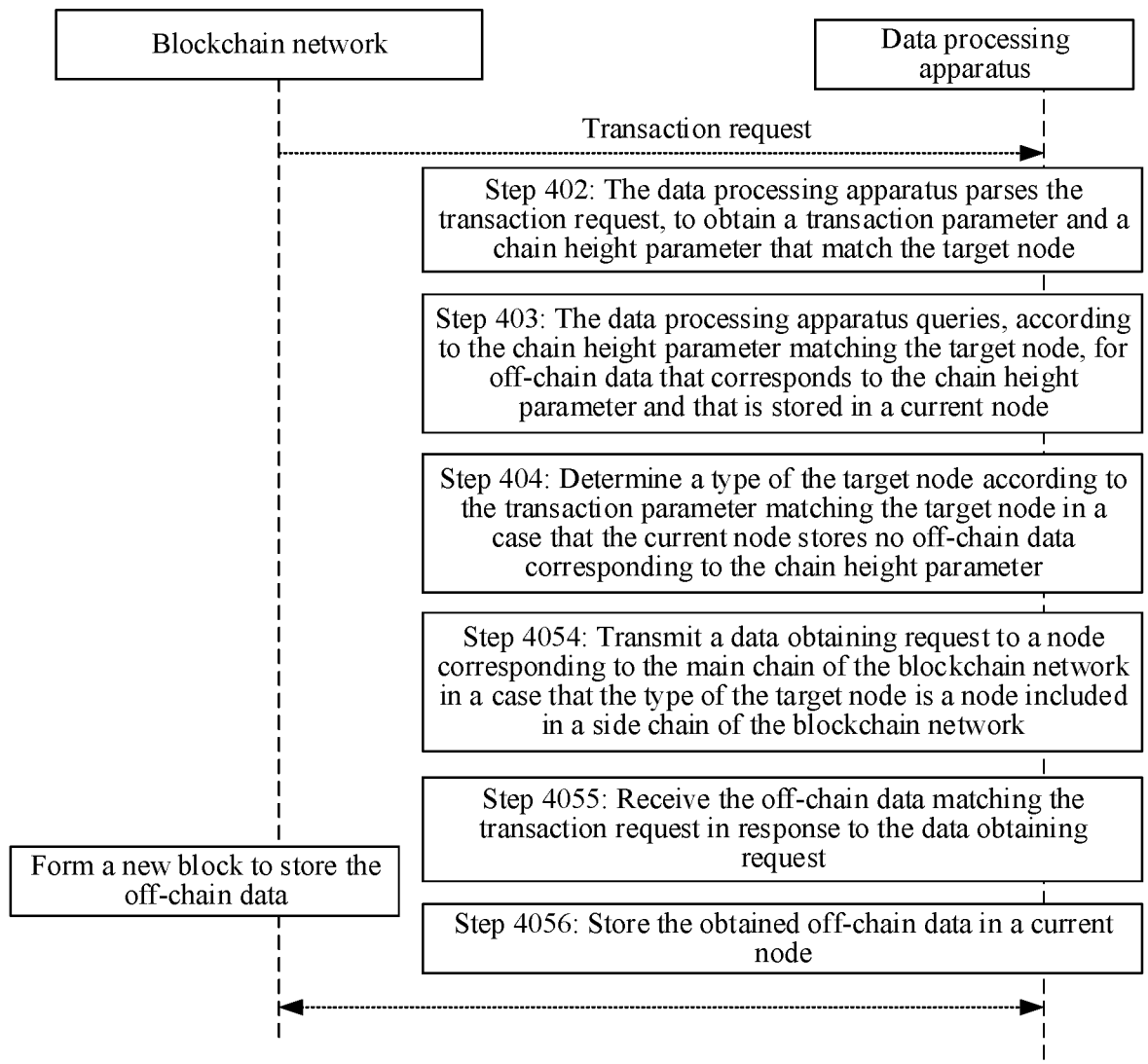
FIG. 6 is a schematic flowchart of a data processing method based on a blockchain network according to one or more embodiment of the present disclosure.

In some embodiments of the present disclosure, when the type of the target node is the node included in the side chain of the blockchain network, further refer to FIG. 6 based on the data processing method based on a blockchain network shown in FIG. 4. FIG. 6 is an optional schematic flowchart of a data processing method based on a blockchain network according to an embodiment of the present disclosure. A processing process includes the following steps:

Step 4054: Transmit a data obtaining request to a node corresponding to the main chain of the blockchain network in response to determining that the type of the target node is the node included in the side chain of the blockchain network.

Step 4055: Receive the off-chain data corresponding to or matching the transaction request in response to the data obtaining request.

Step 4056: Store the obtained off-chain data in the current node.

In response to determining that the type of the target node is the node included in the side chain of the blockchain network, the data obtaining request is transmitted to the node corresponding to the main chain of the blockchain network, to receive the off-chain data corresponding to or matching the transaction request. In this way, off-chain data obtained by different nodes in the blockchain network is consistent, and a possibility of a fork caused by inconsistency of the data is reduced.

In some embodiments of the present disclosure, the method further includes: receiving a data synchronization request of another node in the blockchain network; performing verification on a permission of the another node in response to the data synchronization request; and controlling the current node to perform data synchronization with the another node in response to determining that the permission of the another node is verified, so that the another node obtains corresponding off-chain data. Because another node in the blockchain network cannot obtain off-chain data of a target user uploaded by the current node, when another node in the blockchain network expect to obtain corresponding off-chain data of the target user, a corresponding data synchronization request needs to be transmitted. In an example in which a user adjusts off-chain data, when the target user adjusts the current off-chain data to trigger other off-chain data, the blockchain network management platform may perform verification on a permission of the another node according to the received data synchronization request, and controls, when the permission of the another node is verified, the current node to perform data synchronization between the current node and the another node (for example, the data synchronization may be performed by reaching a consensus between the another node and the current node), which ensures the integrity of the off-chain data of the target user transmitted among various nodes.

Figure 7:
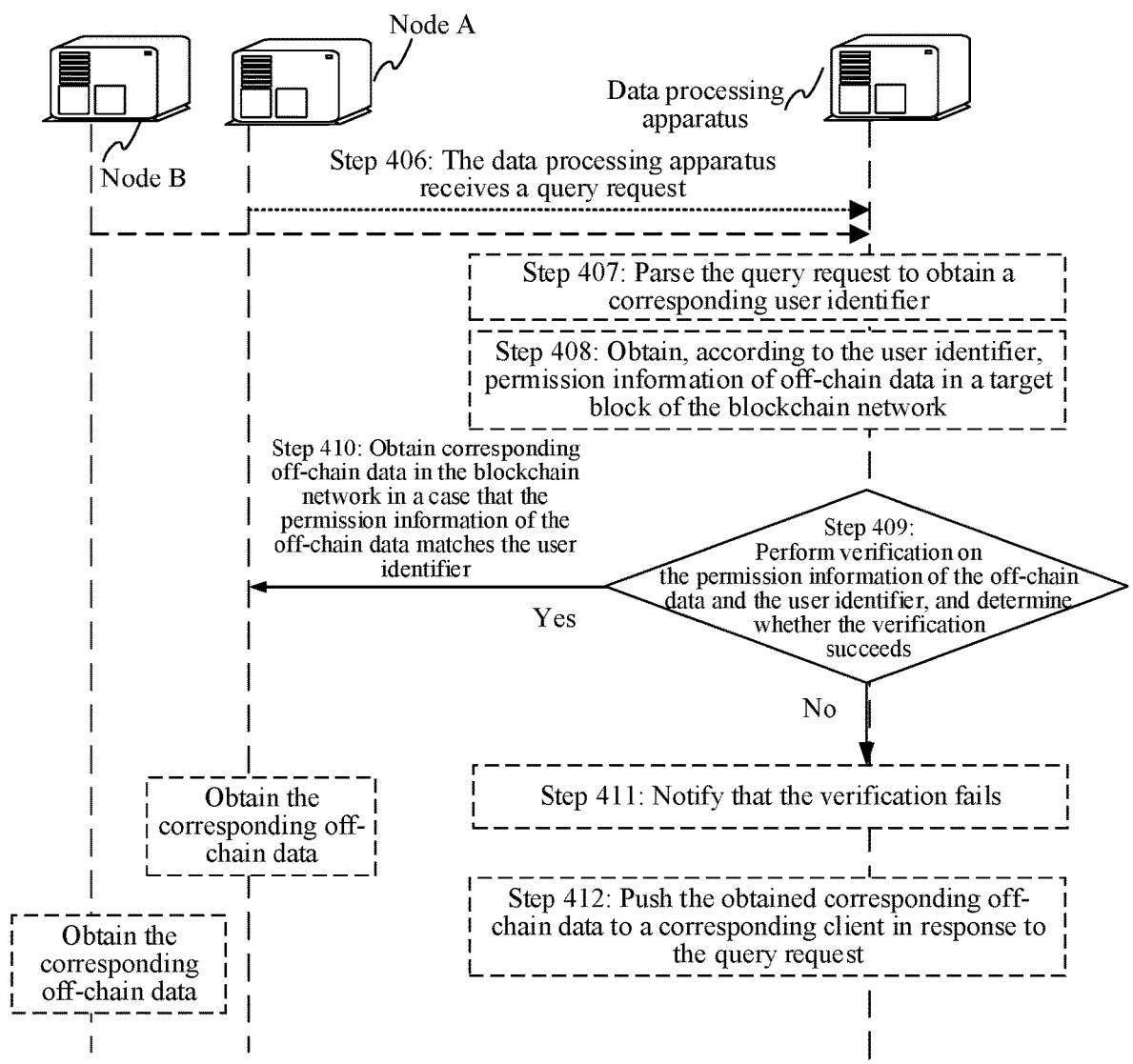
FIG. 7 is a schematic flowchart of a data processing method based on a blockchain network according to one or more embodiments of the present disclosure.

In some embodiments of the present disclosure, when another node in the blockchain network needs to query for corresponding off-chain data of a target user in the blockchain network, further refer to FIG. 7 based on the data processing method based on a blockchain network shown in FIG. 4. FIG. 7 is an optional schematic flowchart of a data processing method based on a blockchain network according to an embodiment of the present disclosure. A processing process includes the following steps:

Step 406: The data processing apparatus receives a query request.

FIG. 7 shows that the query requests of different nodes A and B in the blockchain network are received and corresponding processing is performed respectively.

Step 407: Parse the query request to obtain a corresponding user identifier.

Step 408: Obtain, according to the user identifier, permission information of off-chain data in a target block of the blockchain network.

In some embodiments of the present disclosure, the obtaining, according to the user identifier, permission information of off-chain data in a target block of the blockchain network may be implemented in the following manner: obtaining query condition information in the query request, the query condition information including a target index value of at least one target dimension; querying an information index table of the blockchain network according to the target index value of at least one target dimension, to obtain a user identifier corresponding to the off-chain data, the information index table including a user identifier of stored information and index values of different dimensions; and determining the permission information of the off-chain data in the target block according to the user identifier corresponding to the off-chain data. Because the off-chain data of the target user stored in the current node in the blockchain network can be invoked and queried for by another corresponding node, the user identifier corresponding to the off-chain data of the target user is obtained by querying the information index table of the blockchain network, and the permission information of the off-chain data of the target user in the target block is determined according to the user identifier corresponding to the off-chain data of the target user, which may overcome a defect in the conventional centralized storage method, that is, a disparity in the control capability of the off-chain data of the target user between an actual owner of the off-chain data of the target user and an operator of various Internet applications, and overcome a loophole in the conventional centralized storage method that the operator of Internet applications may wantonly analyze and use the off-chain data of the target user, and even sell the off-chain data of the target user to gain benefits, which threatens user security.

Step 409: Perform verification on the permission information of the off-chain data and the user identifier, and determine whether the verification succeeds. If the verification succeeds, step 410 is performed; otherwise, step 411 is performed.

Step 410: Obtain corresponding off-chain data in the blockchain network in response to determining that the permission information of the off-chain data matches the user identifier.

Step 411: Notify that the verification fails.

Step 412: Push the obtained corresponding off-chain data to a corresponding client in response to the query request.

Through the technical solutions described in this embodiment, when another node (a different user) wants to query for or use the off-chain data of the target user stored in the blockchain network, information about the node first needs to be verified to avoid that an unauthorized node pretends to be a node to obtain the off-chain data of the target user. In this process, corresponding off-chain data of the target user is obtained, and then the off-chain data of the target user is stored in the blockchain network. In addition, the off-chain data of the target user may be viewed by a verified node after chained up. Because the off-chain data of the target user is released in the form of blockchain, a historical record of the off-chain data of the target user may be viewed without other institutions, which resolves problems of low efficiency in transmission and use processes of the off-chain data of the target user and a fork of the blockchain network caused by inconsistency of off-chain data, and effectively improves security while improving a speed of processing data.

Figure 8:
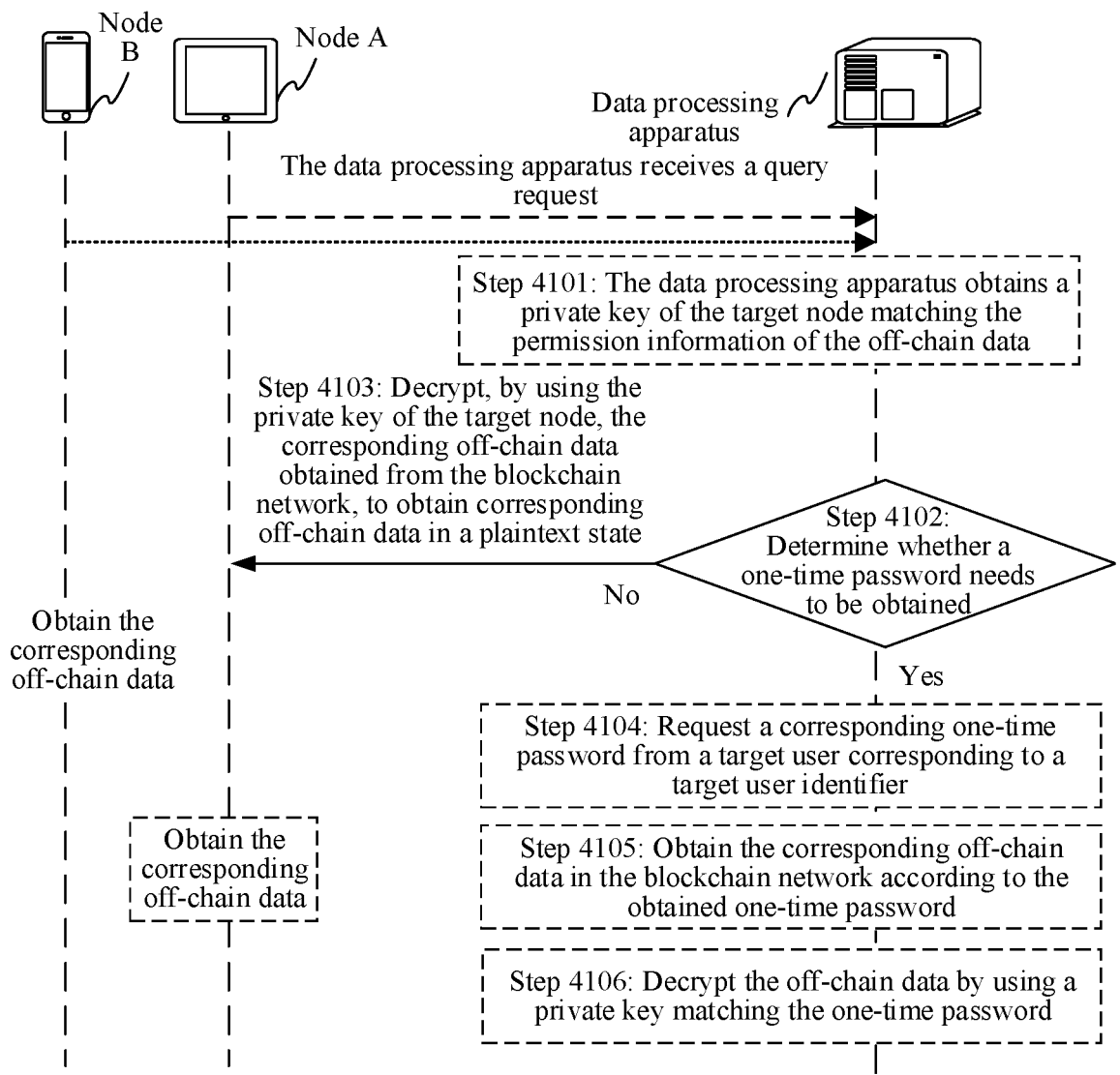
FIG. 8 is a schematic flowchart of a data processing method based on a blockchain network according to one or more embodiments of the present disclosure.

In some embodiments of the present disclosure, when another node in the blockchain network needs to query for corresponding off-chain data of a target user in the blockchain network, further refer to FIG. 8 based on the data processing method based on a blockchain network shown in FIG. 4. FIG. 8 is an optional schematic flowchart of a data processing method based on a blockchain network according to an embodiment of the present disclosure. A processing process includes the following steps:

Step 4101: The data processing apparatus obtains a private key of the target node corresponding to or matching the permission information of the off-chain data.

Step 4102: Determine whether a one-time password needs to be obtained. If yes, step 4104 is performed; otherwise, step 4103 is performed.

Step 4103: Decrypt, by using the private key of the target node, the corresponding off-chain data obtained from the blockchain network, to obtain corresponding off-chain data in a plaintext state.

Step 4104: Request a corresponding one-time password from a target user corresponding to a target user identifier.

Step 4105: Obtain the corresponding off-chain data in the blockchain network according to the obtained one-time password; and Step 4106: Decrypt the off-chain data by using a private key corresponding to or matching the one-time password.

In this way, the off-chain data corresponding to or matching the target user identifier may be obtained.

Because some or all off-chain data of the target user stored in the blockchain network is encrypted information, the corresponding off-chain data of the target user obtained from the blockchain network is decrypted by using the private key of the target node, to obtain the corresponding off-chain data of the target user, so that the corresponding off-chain data of the target user can be used in the form of plaintext data. Further, when a corresponding one-time password is requested from the target user corresponding to the target user identifier, the target user can timely learn when the off-chain data of the target user is viewed by another corresponding node (a different user), and timely communicate with the another node (the different user).

Figure 9:
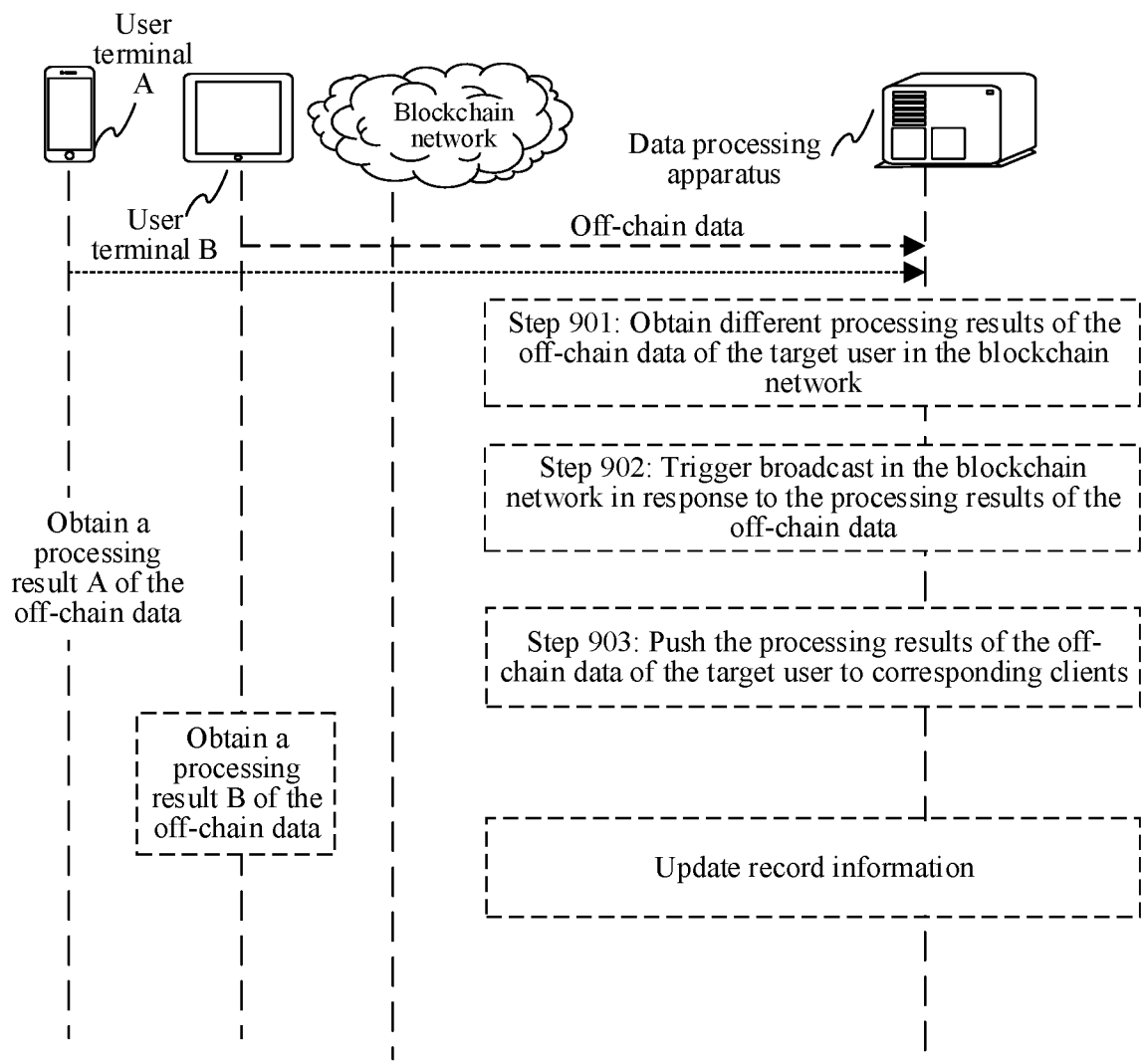
FIG. 9 is a schematic flowchart of a data processing method based on a blockchain network according to one or more embodiments of the present disclosure.

The data processing method provided according to certain embodiments of the present disclosure is described with reference to the electronic device shown in FIG. 3. FIG. 9 is an optional schematic flowchart of a data processing method based on a blockchain network according to an embodiment of the present disclosure. It may be understood that, steps shown in FIG. 9 may be performed by various electronic devices running the data processing apparatus, such as a dedicated terminal, a server, or a server cluster with a function of processing off-chain data of a target user. The following describes the steps shown in FIG. 9.

Step 901: Obtain different processing results of the off-chain data of the target user in the blockchain network.

The off-chain data may be processed based on a corresponding smart contract. The smart contract may store data, and the data may be configured to record information, facts, associations, balances, and any other information needed for the contract to execute logic. The smart contract may be described as a computer-executable program including a function, in which an instance of the smart contract may be created and the function may be invoked to execute the logic of the smart contract.

In some embodiments of the present disclosure, the smart contract may be implemented based on an object and an object-oriented class. For example, a term and a component of the smart contract may be represented as objects processed by an application program that implements the smart contract. The smart contract (or an object in the smart contract) may invoke another smart contract (or an object in the same smart contract) like other object-oriented objects. For example, invocation performed by the object may be invocation for creation, update, deletion, propagation, or communication with an object of another class. Invocation between objects may be implemented by a function, a method, an application programming interface (API), or another invocation mechanism. For example, a first object may invoke a function to create a second object.

In some embodiments of the present disclosure, an identifier of the target user may be obtained by a node device of the blockchain by invoking a smart contract deployed in the blockchain network. The smart contract declares that a corresponding target user identifier is generated based on the target user. Off-chain data of the corresponding target user may be determined by using the target user identifier.

Step 902: Trigger broadcast in the blockchain network in response to the processing results of the off-chain data.

In this way, data synchronization between other nodes in the blockchain network may be implemented, and a processing result corresponding to or matching the off-chain data of the target user may be updated.

Step 903: Push the processing results of the off-chain data of the target user to corresponding clients.

Through the technical solutions described in this embodiment, when the off-chain data of the target user is processed by a corresponding node, the processing result is stored in the blockchain network. Because the nodes in the blockchain network construct a P2P network system with a distributed data storage structure by using a consensus mechanism, data in the blockchain is distributed in "blocks" connected in time, a current block contains a data digest of a previous block, and a full backup of all or a part of the node data is achieved depending on different consensus mechanisms (such as PoW, PoS, DPoS, or PBFT). A person skilled in the art knows well that because the blockchain network operates under a corresponding consensus mechanism, it is difficult for any node to tamper with data included in the blockchain database. For example, in a blockchain using the PoW consensus, at least 51% of computing power of the entire network is needed to tamper with existing data. Therefore, compared with other centralized database systems, the blockchain system has the incomparable characteristics of ensuring data security and preventing attacks and tampering. Therefore, it can be learned that the data included in the distributed database of the blockchain is not to be attacked or tampered with, which ensures authenticity and reliability of a processing result of off-chain data stored in the distributed database of the blockchain, and avoids a fork of the blockchain network caused by a change of the processing result of the off-chain data.

Figure 10:
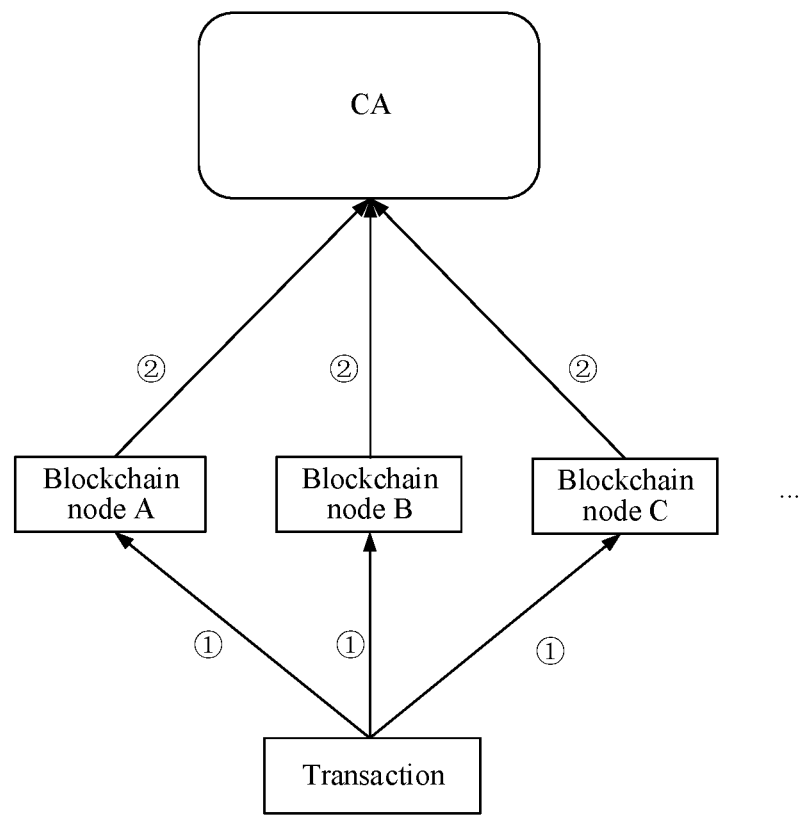
FIG. 10 is a schematic diagram of an optional use environment of a data processing method based on a blockchain network according to one or more embodiments of the present disclosure.

The following describes the data processing method based on a blockchain network provided in the present disclosure. FIG. 10 is a schematic diagram of an optional use environment of a data processing method based on a blockchain network according to the present disclosure. In a scenario of using a digital certificate to perform verification on validity of an identity of each member node in a blockchain transaction, validity of a digital certificate of a blockchain node needs to be verified by a CA (certificate authority). A transaction is transmitted to nodes A, B, and C in a blockchain, and the nodes A, B, and C in the blockchain request the CA to perform verification on validity of a digital certificate of the transaction (transaction transmission is shown in ①, and requesting the CA to perform verification on the validity of the certificate is shown in ②). In this process, a validity period of the digital certificate is verified by the CA. In the blockchain network, the nodes receive the transaction at different times, and therefore, the CA is requested at different times to perform verification on the digital certificate. If a node requests verification of the CA within the validity period of the digital certificate, the verification succeeds. If a node requests verification of the CA beyond the validity period of the digital certificate, the verification fails. Different verification results of different nodes lead to different processing results of the different nodes for the transaction, leading to a fork of the blockchain network.

Figure 11:
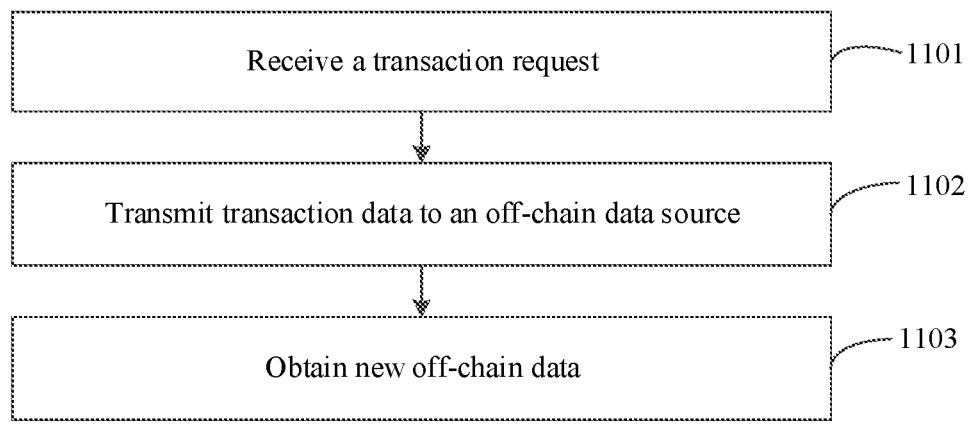
FIG. 11 is a schematic diagram of a use process of a data processing method based on a blockchain network in certain related art.
Figure 12:
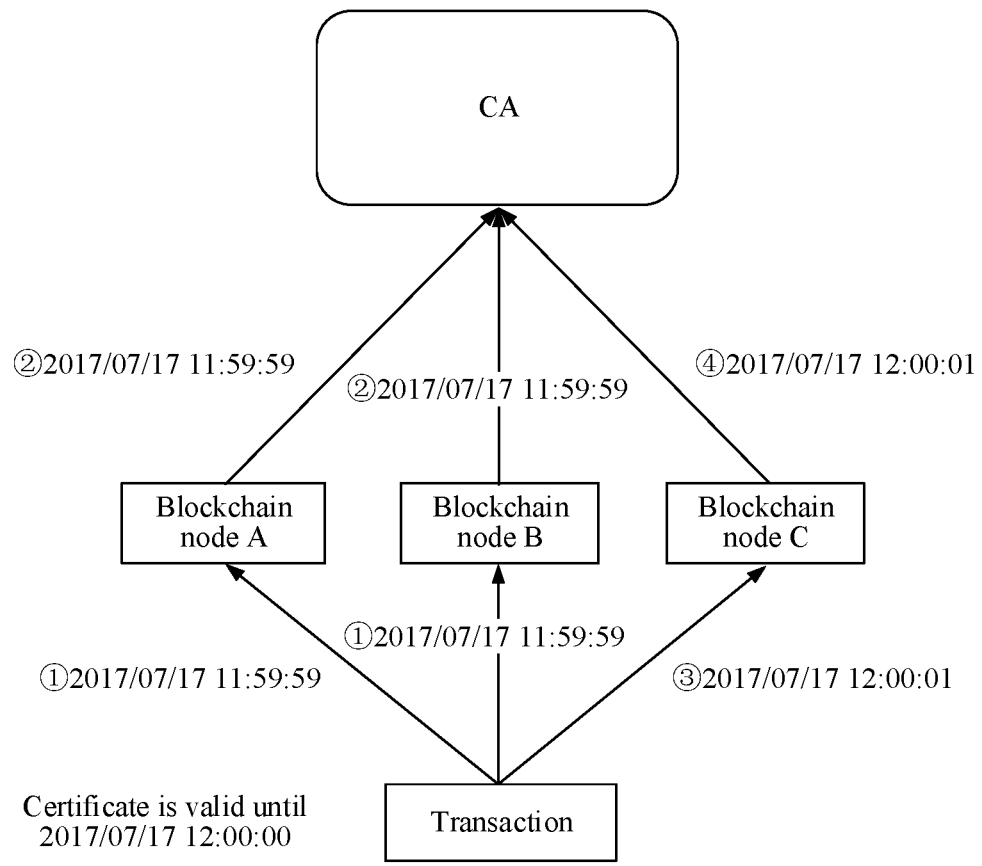
FIG. 12 is a schematic diagram of contract verification in a data processing method based on a blockchain network in certain related art.

Referring to FIG. 11 and FIG. 12, the following describes a fork of a blockchain network in the related art.

FIG. 11 is a schematic diagram of a use process of a data processing method based on a blockchain network in the related art, including the following steps:

Step 1101: Receive a transaction request.

Step 1102: Transmit transaction data to an off-chain data source.

Step 1103: Obtain new off-chain data.

FIG. 12 is a schematic diagram of contract verification in a data processing method based on a blockchain network in the related art. As shown in FIG. 12, the certificate of the transaction is valid until 2017 Jul. 17 12:00:00.

The nodes A and B receive the transaction (①) at 11:59:59 on 2017 Jul. 17, and request the CA to perform verification on the validity of the certificate (②).

The CA verifies that the certificate is within the validity period, and the verification succeeds, and the nodes A and B execute the transaction successfully.

Due to a delay or other reasons, the node C receives the transaction (③) at 12:00:01 on 2017 Jul. 17, and requests the CA to perform verification on the validity of the certificate (④). The CA verifies that the certificate is out of the validity period, and the verification fails, and the node C fails to execute the transaction. Therefore, data of the node C is inconsistent with that of the nodes A and B, leading to a fork in the blockchain network.

Similarly, as long as the blockchain system needs to access off-chain data, due to uncertainty of a transaction time, it is possible to cause the fork defect of the blockchain network shown in FIG. 12.

Figure 13:
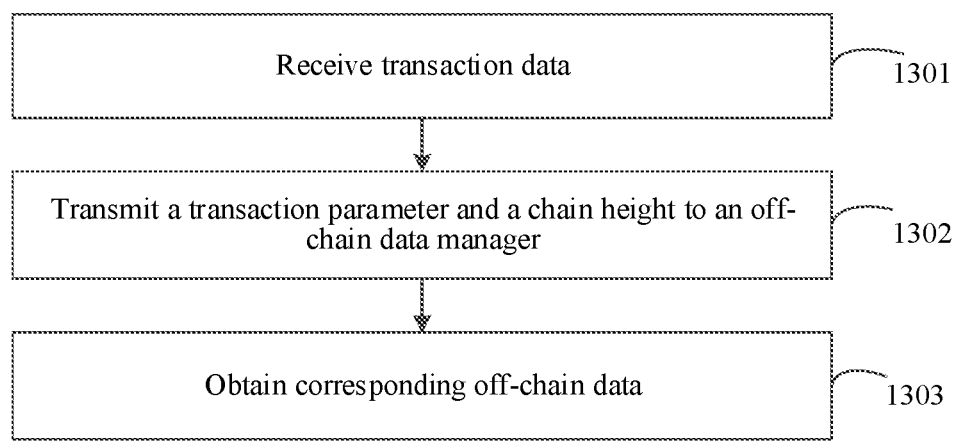
FIG. 13 is a schematic diagram of a use process of a data processing method based on a blockchain network according to one or more embodiments of the present disclosure.
Figure 14:
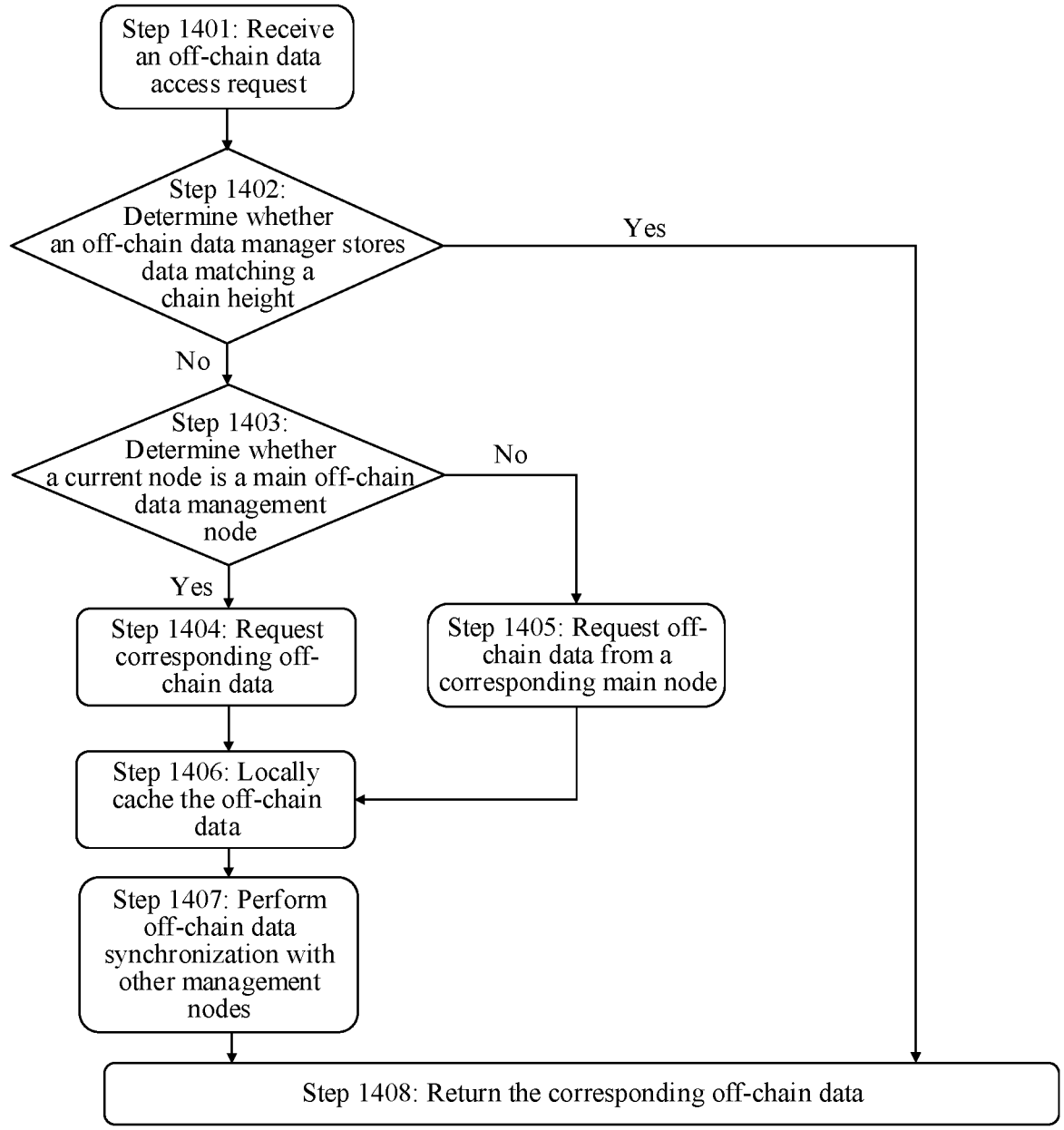
FIG. 14 is a schematic diagram of a processing process of an off-chain data manager in a data processing method based on a blockchain network according to one or more embodiments of the present disclosure.
Figure 15:
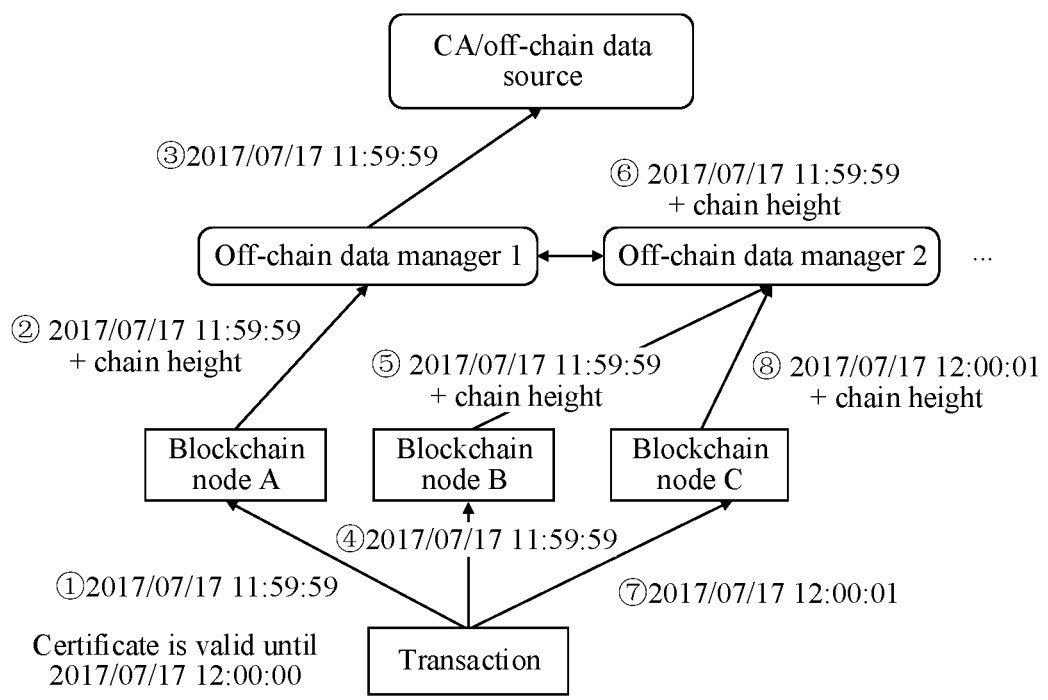
FIG. 15 is a schematic diagram of contract verification in a data processing method based on a blockchain network according to one or more embodiments of the present disclosure.

Referring to FIG. 13, FIG. 14, and FIG. 15, the following describes a use process of a data processing method based on a blockchain network according to the present disclosure. FIG. 13 is a schematic diagram of a use process of a data processing method based on a blockchain network according to the present disclosure, including the following steps:

Step 1301: Receive transaction data.

Step 1302: Transmit a transaction parameter and a chain height to an off-chain data manager.

Step 1303: Obtain corresponding off-chain data.

FIG. 14 is a schematic diagram of a processing process of an off-chain data manager in a data processing method based on a blockchain network according to the present disclosure, including the following steps:

Step 1401: Receive an off-chain data access request.

Step 1402: Determine whether the off-chain data manager stores data corresponding to or matching the chain height. If yes, step 1408 is performed; otherwise, step 1403 is performed.

Step 1403: Determine whether a current node is a main off-chain data management node. If yes, step 1404 is performed; otherwise, step 1405 is performed.

Step 1404: Request corresponding off-chain data.

Step 1405: Request off-chain data from a corresponding main node.

Step 1406: Locally cache the off-chain data.

Step 1407: Perform off-chain data synchronization with other management nodes.

Step 1408: Return the corresponding off-chain data.

Parameters received by the off-chain data manager include transaction-related data and the chain height. The data corresponding to the chain height is directly returned to a blockchain node when the data exists locally, which resolves a problem of data inconsistency caused because different blockchain nodes directly access the off-chain data source.

Furthermore, among a plurality of off-chain data managers, only a main off-chain data manager obtains data from the off-chain data source. Consistency protocol such as Raft or Paxos may be used between the off-chain data management sources to synchronize data, to ensure that the data between the plurality of off-chain data managers is consistent.

FIG. 15 is a schematic diagram of contract verification in a data processing method based on a blockchain network according to the present disclosure. After an off-chain data manager is introduced, a transaction process is shown in FIG. 15. A certificate of a transaction is valid until 2017 Jul. 17 12:00:00.

① The node A receives the transaction at 11:59:59 on 2017 Jul. 17.

② The node A transmits transaction data (including the digital certificate) and a current chain height ([transaction_data, chain_height]) to an off-chain data manager 1.

③ The off-chain data manager 1 uses relevant data in the transaction data to access an off-chain data source and returns data to the node A.

④ The node B receives the transaction at 11:59:59 on 2017 Jul. 17.

⑤ The node B transmits transaction data (including the digital certificate) and a current chain height ([transaction_data, chain_height]) to an off-chain data manager 2.

⑥ The off-chain data manager 2 has no data locally, and therefore requests data from the main off-chain data manager 1. The off-chain data manager 1 has data corresponding to chain_height locally, and therefore returns the data to the off-chain data manager 2. Then the data is returned to the node B. Therefore, the off-chain data obtained by the node B is consistent with that of the node A.

⑦ The node C receives the transaction at 12:00:01 on 2017 Jul. 17.

⑧ The node C transmits transaction data (including the digital certificate) and a current chain height ([transaction_data, chain_height]) to the off-chain data manager 2. In this case, the off-chain data manager 2 has data corresponding to chain_height locally, and therefore directly returns the data to the node C. Therefore, the off-chain data obtained by the node C is consistent with that of the node A and the node B.

In this way, consistency of off-chain data obtained by different nodes in the blockchain network is ensured, and a fork of the blockchain network caused by inconsistency of the off-chain data obtained by different nodes in the blockchain network is avoided, and the data processing capability of the blockchain network is improved.

The present disclosure has the following beneficial technical effects:

A transaction request transmitted by a target node is obtained. The transaction request is parsed, to obtain a transaction parameter and a chain height parameter that match the target node. According to the chain height parameter corresponding to or matching the target node, off-chain data that corresponds to the chain height parameter and that is stored in a current node is queried for. A type of the target node is determined according to the transaction parameter corresponding to or matching the target node in response to determining that the current node stores no off-chain data corresponding to the chain height parameter. A process matching the type of the target node is triggered according to the type of the target node, to obtain off-chain data corresponding to or matching the transaction request. In this process, some or all nodes in a blockchain can access consistent off-chain data when obtaining off-chain data, thereby avoiding a fork of the blockchain network caused by inconsistency of off-chain data obtained by different nodes in the blockchain network, and improving data processing efficiency of the blockchain network, while retaining a distributed characteristic of the blockchain network and avoiding paralysis of the blockchain network caused by some faulty nodes in the blockchain network.

The foregoing descriptions are directed to certain embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A data processing method executed via an interplay between a first data manager and a second data manager both connected to a blockchain network, the first data manager and the second data manager each including a hardware processor, the method comprising:

obtaining, by the second data manager, from a target node a transaction request for off-chain data, the target node being a smart phone, a smart pad, a laptop computer, or a desktop computer;

parsing, by the second data manager, the transaction request to obtain a transaction parameter and a chain height parameter of the target node;

querying, by the second data manager, according to the chain height parameter of the target node, for the off-chain data;

in response to determining the off-chain data is present in the second data manager, sending, by the second data manager, the off-chain data to the target node; and in response to determining the off-chain data is absent in the second data manager, determining, by the second data manager, a type of the target node according to the transaction parameter, sending, by the second data manager, a data request for the off-chain data to the first data manger, the data request including the type of the target node according to the transaction parameter;

obtaining, by the first data manager, the off-chain data from a data source according to the type of the target node as determined and according to the data request from the second data manager;

sending, by the first data manager, the off-chain data to the first data manager; and receiving, by the second data manger, the off-chain data from the first data manager; and sending, by the second data manager, the off-chain data to the target node.

2. The method according to claim 1, further comprising:
triggering, by the second data manger, a chain height traversing process in response to the transaction request to query for the off-chain data.

3. The method according to claim 1, further comprising:
parsing, by the second data manger, the transaction parameter to obtain a type parameter of the target node;
determining, by the second data manger, that the target node is in a main chain of the blockchain network in response to determining the type parameter of the target node is a first type parameter; and determining, by the second data manger, that the target node is in a side chain of the blockchain network in response to determining the type parameter of the target node is a second type parameter.

4. The method according to claim 3, further comprising:
parsing, by the second data manger, the transaction request to obtain storage location information of the off-chain data in response to determining the target node is in the main chain of the blockchain network; and
obtaining, by the second data manger, the off-chain data according to the storage location information of the off-chain data.

5. The method according to claim 3, further comprising:
transmitting, by the second data manger, a data obtaining request to the main chain of the blockchain network in response to determining the target node is in the side chain of the blockchain network; and
receiving, by the second data manger, the off-chain data in response to the data obtaining request.

6. The method according to claim 1, further comprising:
receiving, by the second data manger, a data synchronization request of the first second data manager connected to the blockchain network.

7. The method according to claim 1, further comprising:
receiving, by the second data manger, a query request, and parsing the query request to obtain a user identifier;
obtaining, by the second data manger, permission information of the off-chain data in the target node of the blockchain network according to the user identifier;
performing, by the second data manger, verification on the permission information of the off-chain data and the user identifier; and
obtaining, by the second data manger, the off-chain data in the blockchain network in response to determining the permission information of the off-chain data matches the user identifier.

8. The method according to claim 7, further comprising:
transmitting, by the second data manger, prompt information in response to determining the permission information of the off-chain data does not match the user identifier, the prompt information being used for prompting a user to perform verification on the permission information of the off-chain data.

9. The method according to claim 7, further comprising:
obtaining, by the second data manger, query condition information in the query request, the query condition information including a target index value of at least one target dimension; and
determining, by the second data manger, the permission information of the off-chain data in the target node according to the target index value.

10. The method according to claim 7, further comprising:
obtaining, by the second data manger, a private key of the target node; and
decrypting, by the second data manger, by using the private key of the target node, the off-chain data to obtain decrypted off-chain data.

11. The method according to claim 7, further comprising:
requesting, by the second data manger, a one-time password from a target user;
obtaining, by the second data manger, the off-chain data according to the one-time password; and
decrypting, by the second data manger, the off-chain data by using the one-time password to obtain the off-chain data.

12. The method according to claim 7, further comprising:
obtaining, by the second data manger, a processing result of the off-chain data; and
triggering, by the second data manger, broadcast in the blockchain network in response to the processing result of the off-chain data.

13. A data processing apparatus including a first data manager and a second data manager both connected to a blockchain network, the first data manager and the second data manager each comprising: a memory; and a processor coupled to the memory, the processor being positioned to perform:
obtaining, by the second data manager, from a target node a transaction request for off-chain data;
parsing, by the second data manager, the transaction request to obtain a transaction parameter and a chain height parameter of the target node, the target node being a smart phone, a smart pad, a laptop computer, or a desktop computer;
querying, by the second data manager, according to the chain height parameter of the target node, for the off-chain data;
in response to determining the off-chain data is present in the second data manager, sending, by the second data manager, the off-chain data to the target node; and
in response to determining the off-chain data is absent in the second data manager, determining, by the second data manager, a type of the target node according to the transaction parameter, sending, by the second data manager, a data request for the off-chain data to the first data manger, the data request including the type of the target node according to the transaction parameter;
obtaining, by the first data manager, the off-chain data from a data source according to the type of the target node as determined and according to the data request from the second data manager;
sending, by the first data manager, the off-chain data to the first data manager; and
receiving, by the second data manager, the off-chain data from the first data manager; and sending, by the second data manager, the off-chain data to the target node.

14. The apparatus according to claim 13, wherein the processor is further positioned to perform:
triggering, by the second data manger, a chain height traversing process in response to the transaction request.

15. The apparatus according to claim 13, wherein the processor is further positioned to perform:
parsing, by the second data manger, the transaction parameter to obtain a type parameter of the target node;
determining, by the second data manger, that the target node is in a main chain of the blockchain network in response to determining the type parameter of the target node is a first type parameter; and
determining, by the second data manger, that the target node is in a side chain of the blockchain network in response to determining the type parameter of the target node is a second type parameter.

16. The apparatus according to claim 15, wherein the processor is further positioned to perform:
parsing, by the second data manger, the transaction request to obtain storage location information of the off-chain data in response to determining the target node is in the main chain of the blockchain network; and obtaining, by the second data manger, the off-chain data according to the storage location information of the off-chain data.

17. The apparatus according to claim 15, wherein the processor is further positioned to perform:
transmitting, by the second data manger, a data obtaining request to the main chain of the blockchain network in response to determining the target node is in the side chain of the blockchain network; and
receiving, by the second data manger, the off-chain data in response to the data obtaining request.

18. The apparatus according to claim 13, wherein the data manager is a first data manager, and wherein the processor is further positioned to perform:
receiving, by the second data manger, a data synchronization request of the first data manager connected to the blockchain network.

19. A non-transitory computer-readable storage medium storing computer program instructions executable by at least one processor to perform a method via an interplay between a first data manager and a second data manager both connected to a blockchain network, the first data manager and the second data manager each including a hardware processor, and the method including:
obtaining, by the second data manager, from a target node a transaction request for off-chain data, the target node being a smart phone, a smart pad, a laptop computer, or a desktop computer;
parsing, by the second data manager, the transaction request to obtain a transaction parameter and a chain height parameter of the target node;
querying, by the second data manager, according to the chain height parameter of the target node, for the off-chain data;
in response to determining the off-chain data is present in the second data manager, sending, by the second data manager, the off-chain data to the target node; and
in response to determining the off-chain data is absent in the second data manager, determining a type of the target node according to the transaction parameter, sending, by the second data manager, a data request for the off-chain data to the first data manger, the data request including the type of the target node according to the transaction parameter; obtaining, by the first data manager, the off-chain data from a data source according to the type of the target node as determined and according to the data request from the second data manager;
sending, by the first data manager, the off-chain data to the first data manager; and
receiving, by the second data manger, the off-chain data from the first data manager; and sending, by the second data manager, the off-chain data to the target node.

20. The non-transitory computer-readable storage medium according to claim 19, wherein the computer program instructions are executable by the processor to further perform:
receiving, by the second data manger, a data synchronization request of the first data manager connected to the blockchain network.

* * * * *